United States Patent
Katsuzawa et al.

(10) Patent No.: US 6,640,421 B2
(45) Date of Patent: Nov. 4, 2003

(54) COIL INSERTER FOR STATOR WINDING

(75) Inventors: Yukio Katsuzawa, Yamanashi (JP); Michi Masuya, Yamanashi (JP); Kiyoshi Tagami, Hachiouji (JP); Hideki Oka, Fujiyoshida (JP)

(73) Assignee: Fanuc Ltd., Yamanashi (JP)

( * ) Notice: Subject to any disclaimer, the term of this patent is extended or adjusted under 35 U.S.C. 154(b) by 152 days.

(21) Appl. No.: 09/791,875

(22) Filed: Feb. 26, 2001

(65) Prior Publication Data

US 2001/0017332 A1 Aug. 30, 2001

(30) Foreign Application Priority Data

Feb. 24, 2000 (JP) ........................... 2000-047143

(51) Int. Cl.⁷ ............................ B23P 19/00; H02K 15/00
(52) U.S. Cl. ............................ 29/732; 29/596; 29/606
(58) Field of Search ........................ 29/733, 732, 596, 29/597, 606, 736, 598, 564.5; 140/124

(56) References Cited

U.S. PATENT DOCUMENTS

| | | | | |
|---|---|---|---|---|
| 2,432,267 A | * | 12/1947 | Adamson | 29/732 |
| 3,698,063 A | * | 10/1972 | Smith | 29/732 |
| 3,815,206 A | * | 6/1974 | Smith | 29/732 |
| 3,885,288 A | * | 5/1975 | Lund | 29/606 |
| 3,888,638 A | * | 6/1975 | Walker | 29/732 |
| 4,383,356 A | * | 5/1983 | Fichtner | 29/732 |
| 4,739,549 A | * | 4/1988 | Rist | 29/732 |
| 5,454,156 A | * | 10/1995 | Morr | 29/732 |
| 5,542,456 A | * | 8/1996 | Nishimura et al. | 29/732 |
| 6,401,326 B1 | * | 6/2002 | Rist et al. | 29/596 |

FOREIGN PATENT DOCUMENTS

| | | |
|---|---|---|
| JP | 54-126905 | 10/1979 |
| JP | 09-215281 | 8/1997 |

* cited by examiner

Primary Examiner—I Cuda Rosenbaum
Assistant Examiner—Marc Jimenez
(74) Attorney, Agent, or Firm—Staas & Halsley LLP

(57) ABSTRACT

Wedge guides 12 for holding a wedge 11 are mounted onto a base 10, and a stripper 15 is fixed to the other end of the wedge guide 12. A blade holder 13 including a plurality of blades 16 vertically installed is held in such a manner as to be freely advanceable and retractable in an up-and-down direction. A coil 30 wound is inserted between the blades 16, and alignment tool 7 is inserted at the tip ends of the blades. A stator iron core 40 is inserted into the alignment tool 7, and the stator iron core 40 is moved until the tip ends of the blades 16 penetrate the stator iron core 40. Thereafter, the stator iron core 40 and a connecting rod 19, the other end of which being connected to the blade holder 13, are pushed by a stator pusher 50, whereby the blade holder 13 is also caused to move together with the stator iron core 40 to insert the coil 30 into grooves in the stator iron core 40.

8 Claims, 4 Drawing Sheets

COIL INSERTER FOR STATOR WINDING

BACKGROUND OF THE INVENTION

1. Field of the Invention

The present invention relates to a coil inserter for inserting a stator coil into a slot of a stator iron core in an electric motor.

2. Description of the Prior Art

With reference to a schematic diagram of FIG. 4, the description will be made of an example of a conventional coil inserter 100.

On an inserter tool 101, a plurality of blades 102 are vertically installed on one circumference at predetermined intervals so as to correspond to teeth between slots of a stator iron core 200. At the upper ends of these blades 102 upwardly extending from the inserter tool 101, there is inserted an alignment tool 103 for guiding the blades 102 onto an inner peripheral surface of the stator iron core 200.

Also, in a space inside the plurality of blades 102 vertically installed on one circumference, there is arranged a stripper 104, which is moved in an up-and-down direction relative to the blades 102 by driving a shaft 106 by a driving source 105.

Further, on the outer periphery of the plurality of blades 102 vertically installed, a plurality of wedge guides 107 are vertically installed on a wedge guide holder 108 on the circumference at predetermined intervals. These wedge guides 107 hold, on the outer side thereof, wedges 110 configured by insulating paper or the like. The wedge guides 107 move in an up-and-down direction relative to the blades 102 by driving a wedge pusher 109.

After a stator winding (coil 300), to be mounted into the slots of the stator iron core, is inserted between the blades 102, the alignment tool 103 is fittingly coupled with the blades 102 at their upper ends, and the alignment tool 103 is inserted into an inner surface of the stator iron core 200 (state of FIG. 4).

Then, the stator iron core 200 is caused to move, while being guided by the alignment tool 103, relative to the coil inserter 100 until upper ends of the wedge guides 107 come into contact with end portions of the slots of the stator iron core 200.

Thereafter, the driving source 105 is driven to move the stripper 104 upward. Then, the coil 300 is pushed up by the stripper 104 to be inserted into the slots of the stator iron core 200. Further, the driving source 105 drives to push up the wedge pusher 109 to thereby raise a wedge guide holder 108 and the wedge guides 107. Then, the wedge 110 held by the wedge guides 107 is inserted into the slots. As a result, this wedge 110 covers a slot opening into which the coil 300 has been inserted.

The stripper 104 rises beyond a position of the upper end surface of the stator iron core 200 at the upper end surface position, whereby the coil 300 will be completely inserted into the slots of the stator iron core 200. The wedge guide 107 rises until it reaches the upper end surface position of the stator iron core 200, whereby the wedge 110 will cover the slot opening over its entire area.

Thereafter, the driving of the driving source 105 is stopped to remove the alignment tool 103. The stator iron core 200 is caused to move upward to thereby extract the stator iron core 200 from this coil inserter 100. At this time, the blade 102 and the wedge guide 107 retract from the stator iron core 200, but the coil 300 and the wedge 110 are prevented from moving by friction or the like, and are held within the slots of the stator iron core 200.

In the above described conventional coil inserter 100, the coil 300 between the blades 102 is directly pushed up toward the stator iron core 200 by the movement of the stripper 104 to be inserted into the slots of the stator iron core 200. At this time, the coil 300 may be crushed by a pushing-up force of the stripper 104 to be stuffed up between the blades 102, that is, a locking phenomenon may occur. There may also arise the inconvenience that the coil 300 is damaged by the blade 102 when the coil 300 is transferred by the movement of the stripper 104.

Therefore, in order to restrain this locking phenomenon or the like from occurring, it is necessary to pay attention to selection of the diameter of coil stock and setting of a coil filling factor into the slots.

In order to completely insert the coil 300 into the slots of the stator iron core 200, the length of the blade 102 has to be equal to or more than the length of the stator iron core 200 in a vertical direction, as the coil 300 is pushed by the stripper 104 and guided by the blades 102. The reason is as follows. That is, at a position where the upper end of the wedge guide 107 comes into contact with the end portions of the slots of the stator iron core 200, the movement of the stator iron core 200 relative to the coil inserter 100 is caused to stop. Then, the stripper 104 is caused to move for starting to insert the coil 300 into the slots. If the blades 102 has not yet reached the upper end portion of the stator iron core 200 in that state, the coil 300 cannot be completely inserted into the slots even if the stripper 104 is caused to move up to such a position as to go beyond the upper end surface of the stator iron core 200.

In this respect, Japanese Patent Application Laid-Open No. 54-126905 disclosed a coil inserter in which the length of the blades is made shorter.

Further, since the conventional coil inserter 100 requires a pushing-up mechanism such as the wedge pusher 109, there is the problem that an apparatus as the coil inserter 100 becomes longer in a vertical direction and it is difficult to save the space.

OBJECTS AND SUMMARY OF THE INVENTION

It is an object of the present invention to improve the above described conventional problems, and to provide a coil inserter capable of avoiding any locking phenomenon and further to provide a coil inserter capable of miniaturizing in a simple mechanism.

In a coil inserter according to the present invention, one end of the plurality of blades for guiding the coil into the slots of the stator iron core is coupled and fixed to a blade holder for supporting, and the stripper for supporting the coil is disposed on the inner periphery side of the blade. This stripper is fixed to a base for supporting the entire inserter. Thus, the stator iron core is urged in the axial direction of the electric motor using stator iron core inserting means, and the blades are inserted between the slots of the stator iron core, whereby the coil supported by the stripper is adapted to be inserted into the slots of the stator iron core.

Particularly, the blade holder is made freely advanceable and retractable. Also, there is provided a wedge guide for holding both ends of the wedge and supporting the rear surface of the wedge in the longitudinal direction, and both ends of the wedge guide are coupled and fixed to the stripper and the base respectively.

By using the above described coil inserter, the stator iron core is caused to advance or retract relative to the coil inserter, whereby the coil is inserted into the slots of the stator iron core. Also, the stator iron core is caused to advance or retract relative to the coil inserter, whereby insertion of the coil into the slots is started, and the blade holder is caused not to advance or retract until the coil reaches a predetermined position of the stator iron core, while after the coil reaches the predetermined position, the blade holder is also caused to advance or retract in response to the advancement or retraction of the stator iron core for inserting the coil. Thus, the locking phenomenon is prevented from occurring. Also, the stator iron core is caused to advance or retract relative to the coil inserter, whereby the wedge is inserted into the slots without being pushed up.

According to the present invention, a small-sized coil inserter can be obtained in a simple mechanism, without causing any locking phenomenon. Since the coil inserter is capable of preventing the locking phenomenon from occurring, it is capable of freely selecting a diameter of material for coil, and improving a filling factor for the coil 3 into the slots of the stator iron core. Also, it can be miniaturized in a simple mechanism and its full length (height) can be made low. Therefore, a space-saving coil inserter can be provided at low cost.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1A:
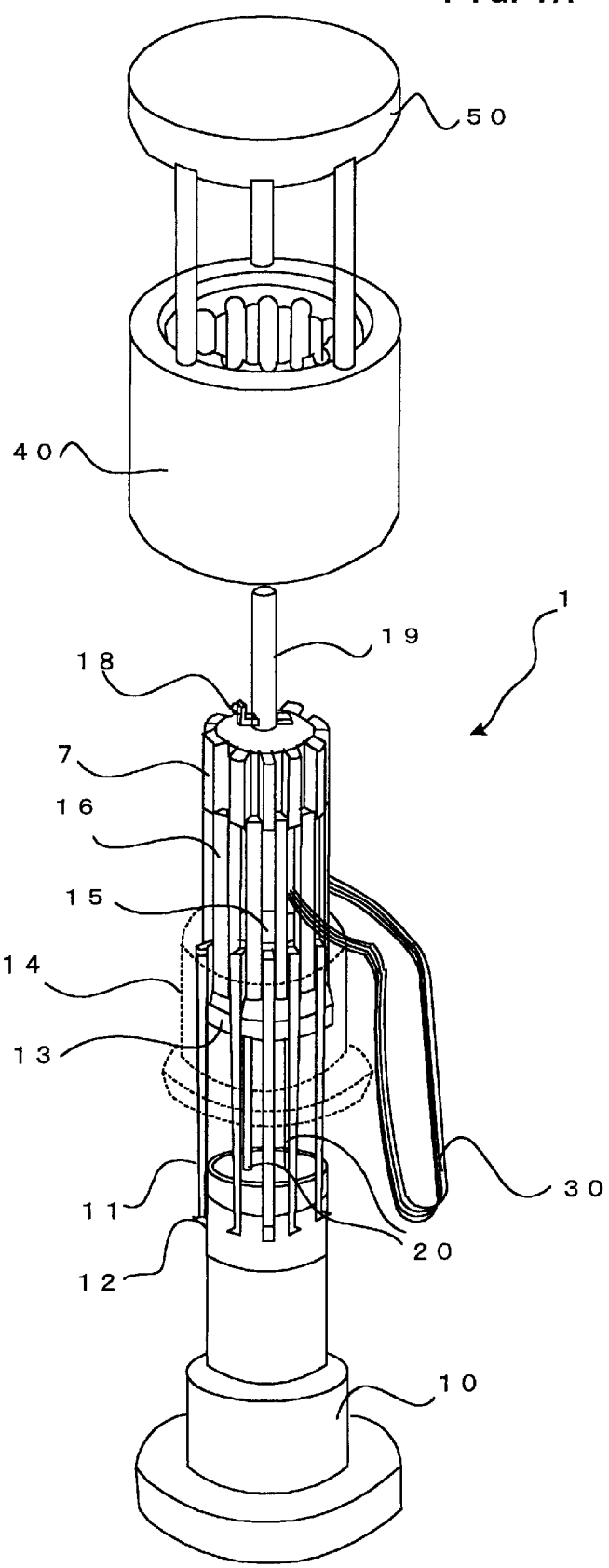
FIG. 1 is a view for schematically explaining insertion of a coil into a stator iron core using a coil inserter according to an embodiment of the present invention.

With reference to FIG. 1, the description will be made of a structure of a coil inserter according to an embodiment of the present invention.

In a base 10 of a coil inserter 1, a plurality of wedge guides 12 are vertically installed at predetermined intervals on a circumference so as to correspond to each slot in a stator iron core 40, to which a stator winding (coil 30) to be mounted. The upper end portions of these wedge guides 12 upwardly extending from the base 10 are fixed to a stripper 15 respectively. Each of these wedge guides 12 holds, on its outer side, a wedge 11 respectively.

When the wedge guide 12 has not sufficient rigidity to support the stripper 15, a strut 20 is fixedly provided between the base 10 and the stripper 15 as shown in FIG. 1 so as to support the stripper 15 by the wedge guide 12 and the strut 20. If the wedge guide 12 to be used has high rigidity, this strut 20 may not be provided.

In the inner side to be surrounded by a plurality of wedge guides 12 upwardly extending from the base 10, a blade holder 13 is placed. This blade holder 13 is capable of moving in an up-and-down direction while being guided by these wedge guides 12. In this respect, in FIG. 1, as described above, the strut 20 is disposed between the base 10 and the stripper 15, and therefore, the blade holder 13 is formed with a through-hole for causing this strut 20 to pass through. For this reason, the blade holder 13 slidably moves in an up-and-down direction while being guided by the strut 20.

On the blade holder 13, a plurality of blades 16 for guiding a coil 30 into the slots in the stator iron core 40 are vertically installed on a circumference at predetermined intervals. Each of these blades 16 extends upwardly from the blade holder 13 respectively so as to correspond to a tooth between the slots in the stator iron core 40.

Also, a connecting rod 19 upwardly extends from the central portion of the blade holder 13. The connecting rod 19 passes through a through-hole formed in the central portion of the stripper 15 on its way.

At the upper ends of the plurality of blades 16 upwardly extending from the blade holder 13, alignment tool 7 is detachably mounted. On the outer peripheral surface of the alignment tool 7, there are formed ridges and grooves at predetermined pitches, and there is, in its central portion, formed a through-hole for allowing the connecting rod 19 to pass through.

When a fixing pin 18 is inserted into the connecting rod 19 in a state in which the connecting rod 19 is caused to pass through the through-hole in the central portion of the alignment tool 7 and the upper end portions of the blades 16 are caused to engage with grooves on the outer peripheral surface thereof, the alignment tool 7 is held at fixed positions of the blades 16. In the alignment tool 7 held at the fixed positions of the blades 16, the ridges on the outer peripheral surface thereof are capable of engaging with the slots in the stator iron core 40.

In the outside circumference of the plurality of wedge guides 12 upwardly extending from the base 10, a wedge case 14 is arranged so that it can move in the longitudinal direction of the wedge guides 12.

In order to insert the stator iron core 40 into the blades 16, a stator pusher 50 is used. This stator pusher 50 and the connecting rod 19 constitute stator iron core inserting means.

In this respect, as described later, a spring 21 is provided between the wedge case 14 and the base 10, whereby it may be possible to hold the position of the wedge case 14 in such a manner that the position of the upper end surface thereof substantially coincides with the position of the stripper 15.

Next, with reference to FIGS. 1 to 3C, the description will be made of an operation of inserting the coil 30 into the slots in the stator iron core 40 using the coil inserter 1 having the configuration described above. In this respect, in the examples shown in FIGS. 2A to 3C, with the provision of a spring 21 between the wedge case 14 and the base 10, the wedge case 14 is held in a manner such that the position of the upper end of the wedge case 14 substantially coincides with the position of the stripper 15.

(1) First, the fixing pin 18 is removed, and the alignment tool 7 is removed from the tip ends of the blades 16 and the connecting rod 19. Thus, the coil 30 to be mounted into the slots in the stator iron core 40 is mounted into the gaps between the blades 16 corresponding to the slots.

After the coil 30 is mounted, the alignment tool 7 is mounted to the connecting rod 19 again and engaged with the tip ends of the blades 16, and the pin 18 is inserted.

Figure 2A:
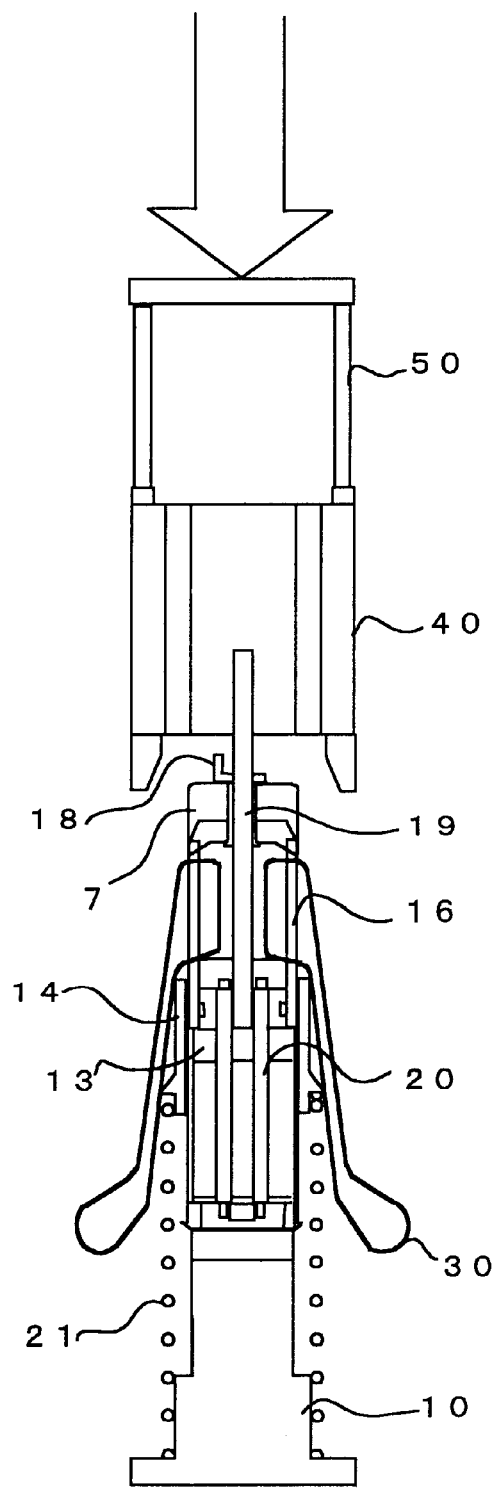
FIGS. 2A and 2B are views for explaining an operation (first and second stages) for inserting a coil into a stator iron core using the coil inserter shown in FIG. 1.

The stator iron core 40 is placed on the upper portion of the coil inserter 1, to which the coil 30 has been set. Further, this stator iron core 40 is positioned at a position where the slots and the ridges of the alignment tool 7 are engaged with each other. Then, as shown in FIG. 2A, the stator iron core 40 is pressed down using the stator pusher 50.

(2) The stator iron core 40 is caused to lower up to a position where the lower end portion of the stator iron core 40 abuts upon the upper end of the wedge case 14 (FIG. 2B), with the slots in the stator iron core 40 engaging with the ridges in the alignment tool 7 and being guided by the blades 16.

Figure 2B:
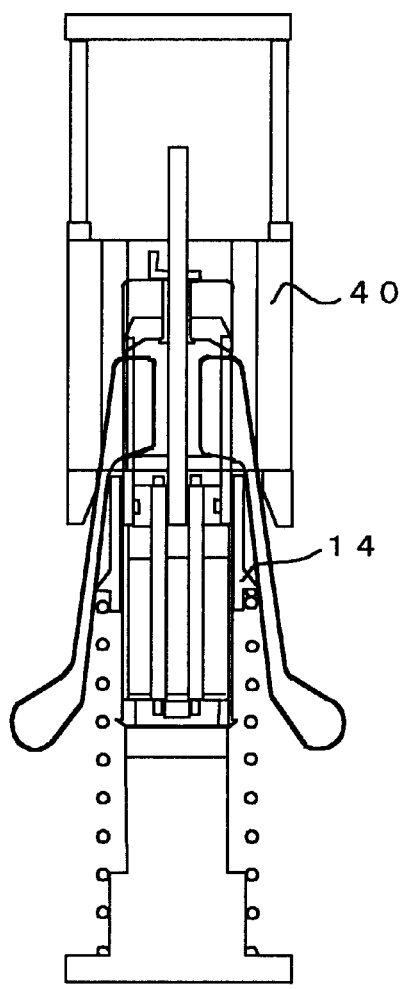
Figure 3A:
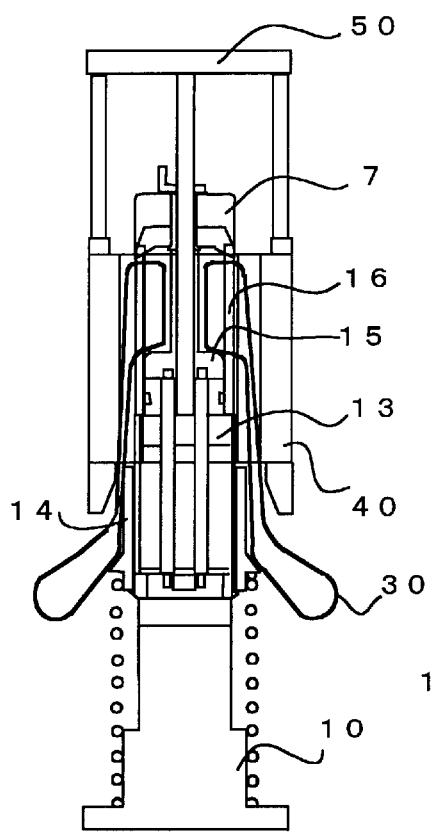
FIGS. 3A to 3C show a continuation (third to fifth stages) of the description of the operation shown in FIGS. 2A and 2B.

(3) The stator iron core 40 and the wedge case 14, which are located at their positions indicated in FIG. 2B, are pushed down using the stator pusher 50 in such a manner that the upper ends of the blades 16 and the lower end surface of the alignment tool 7 come to the position of the upper end of the stator iron core 40 as shown in FIG. 3A.

In this respect, in order to prevent the stator pusher 50 from abutting upon the upper end of the connecting rod 19 before the stator iron core 40 reaches its position indicated in FIG. 3A and from allowing the stator iron core 40 to further lower, the length of legs of the stator pusher 50 or the length of the connecting rod 19 is adjusted in advance. Preferably, as described later, both the stator iron core 40 and the connecting rod 19 are pushed down in synchronism with each other, whereby the length of legs of the stator pusher 50 or the length of the connecting rod 19 should be adjusted in advance in such a manner that the stator pusher 50 abuts upon the tip end of the connecting rod 19 as shown in FIG. 3A when the upper ends of the blades 16 reach the upper end of the stator iron core 40. Also, this connecting rod 19 may be fixed to the stator pusher 50, instead of to the blade holder 13, and the blade holder 13 may be pressed by the tip end of the connecting rod.

When the stator iron core 40 is pushed down from its position indicated in FIG. 2B to the position indicated in FIG. 3A, the stripper 15 moves relative to the stator iron core 40 to reach the nearly intermediate portion thereof. As a result, the coil 30 is inserted to the intermediate portion of the slots in the stator iron core 40 as shown in FIG. 3A.

Further, the wedge 11 and the wedge guides 12 engage with the slots in the stator iron core 40 to cause the wedge 11 to be inserted into openings of the slots in the stator iron core 40, into which the coil 30 has been inserted.

As described above, the present invention is characterized in that what is moved is the stator iron core 40, and not the stripper 15. According to the coil inserter 1 of the present invention, while the stator iron core 40 is pushed down from the position in FIG. 2B to the position in FIG. 3A, the stripper 15, the blades 16 and the coil 30 do not move. Therefore, in this inserter, there does not occur the locking phenomenon in which the coil 30 is crushed by the pushing-up force of the stripper 104 to be stuffed between the blades 16. Even if there occurs such a phenomenon as the stator iron core 40 lowers and the coil 30 is caused to move so as to insert the coil 30 into the slots in the stator iron core 40, no locking phenomenon occurs because the coil 30 hardly moves between the blades 16.

(4) The pin 18 which has held the alignment tool 7 at a fixed position of the blade 16 through the connecting rod 19 is drawn out and the alignment tool 7 are removed from the connecting rod 19 and the blades 16.

Figure 3B:
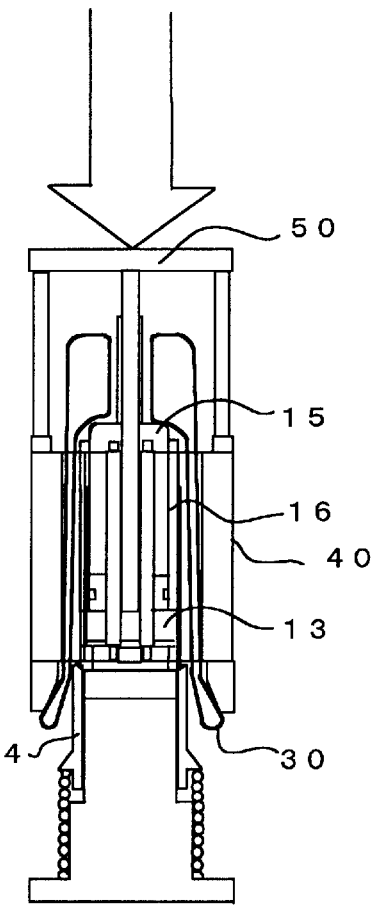

As shown in FIG. 3B, the stator pusher 50 is pushed down against a repulsion force of the spring 21 to bring the stator iron core 40 and the wedge case 14 to the lowest descendant position, that is, until the stripper 15 comes to the upper end surface of the stator iron core 40. In this respect, since the upper end of the connecting rod 19 is in contact with the stator pusher 50, when the stator pusher 50 is pushed down, the blade holder 13 is pushed down to the lowest descendant position through the connecting rod 19, that is, to a position where the blade holder 13 comes into contact with the base 10.

Since the blade holder 13 is pushed down in synchronism with the stator iron core 40 through the connecting rod 19 as described above, no relative movement occurs between the blades 16 and the stator iron core 40. However, since the stripper 15 is fixed to the base 10 through the wedge guides 12 (and struts 20), the stripper 15 moves relative to the stator iron core 40 to completely insert the coil 30 wound into the slots. Further, the wedge 11 held by the wedge guides 12 is inserted in the stator iron core 40 over the full length of the slots.

The foregoing operation completes insertion of the coil 30 into the slots of the stator iron core 40 and insertion of the wedge 11. Moreover, even during this operation, both the stator iron core 40 and the blades 16 are only pushed down in synchronism with each other, and the coil 30 wound will not be pushed up, and therefore, no locking phenomenon occurs. Also, since the blades 16 also move (lower) together with movement (lowering) of the stator iron core 40, the blades 16 always serve as a guide for the stator iron core 40, and the length of the blades 16 can be shorter than the length of the stator iron core 40, and is made shorter in this embodiment.

Figure 3C:
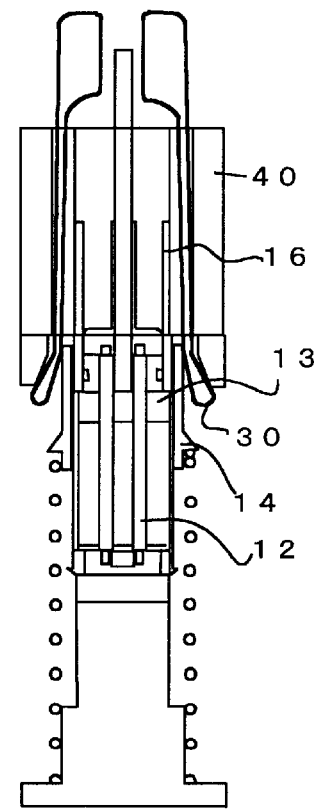
Figure 4:
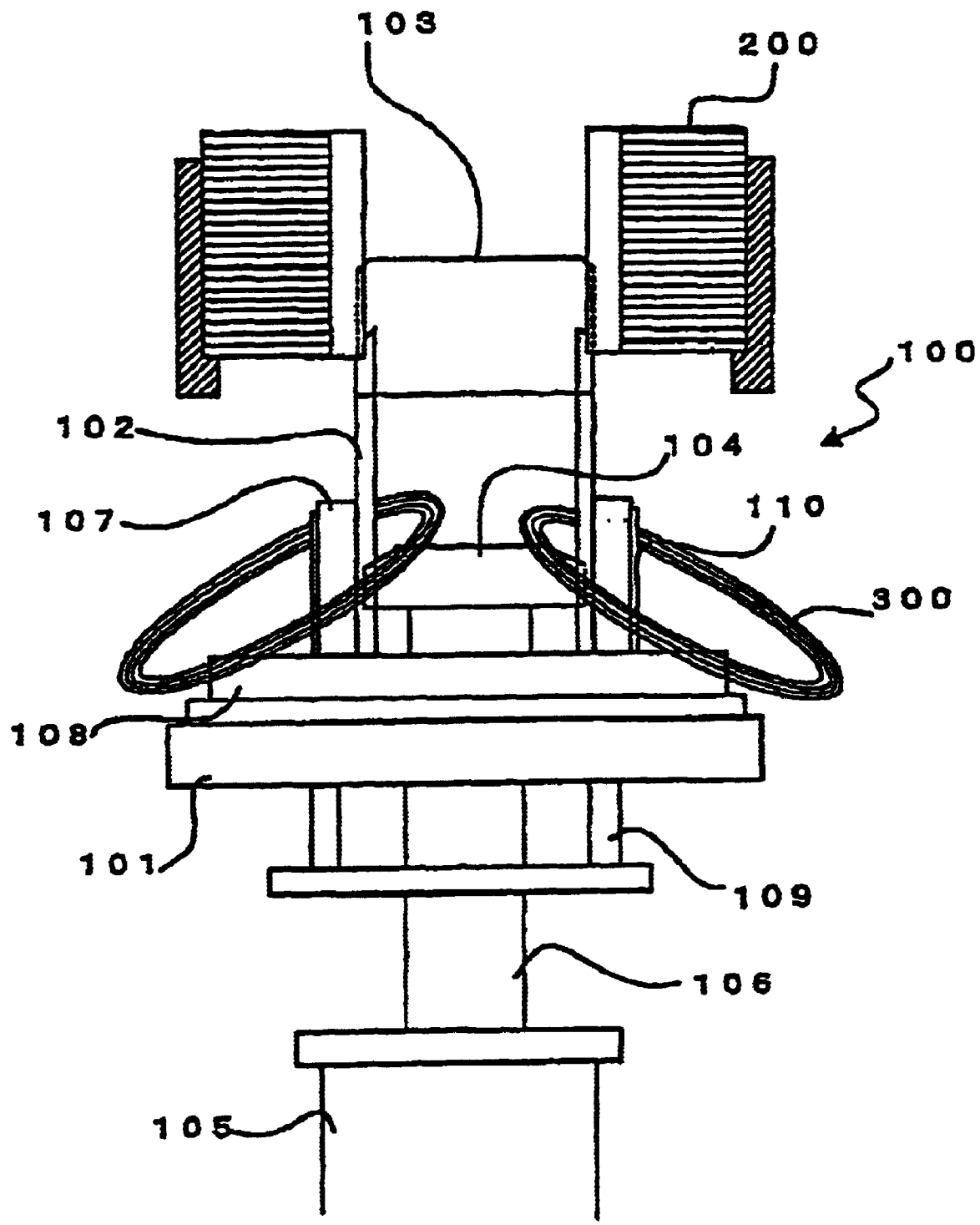
FIG. 4 is a schematic view showing an example of conventional coil inserter.

(5) Finally, when the force which has pushed down the stator iron core 40 is released, the repulsion force of the spring 21 raises the wedge case 14 and the stator iron core 40 as shown in FIG. 3C. At this time, the coil 30, which has been inserted into the slots in the stator iron core 40, remains within the slots, and the wedge 11, which has been inserted into the slots, also remains within the slots, and only the wedge guides 12 retract from the stator iron core 40.

Then, the stator iron core 40 is caused to further rise to be removed from the blades 16.

The operation of inserting the coil 30 into the slots in the stator iron core 40 is completed through the foregoing (1) to (5) stages.

As described above, at the time of inserting the coil 30 by using an inserter according to the present invention into the slots in the stator iron core 40, the stripper 15 does not move, but remains fixed. The coil 30 to be inserted into the slots in the stator iron core 40 moves relative to its stator iron core, but the coil 30 does not move relative to the blades 16, to which the coil 30 is mounted, before the tip ends of the blades 16 reach the upper end surface of the stator iron core.

Thereafter, the stripper 15 reaches the upper end surface of the stator iron core, and both the blades 16 and the stator iron core move in synchronism with each other before the coil insertion is completed, and therefore, any locking phenomenon can be prevented from occurring.

Further, since the stator iron core 40 is caused to move while the wedge guides 12 remain without moving, any mechanism for pushing up the coil 30 and any mechanism for pushing up the wedge holder are not necessitated, and the length of the blades 16 can be also shortened, and therefore, it is possible to obtain a small-sized coil inserter 1 having a simple configuration. Further, any locking phenomenon in which the coil 30 is stuffed can be prevented.

In this respect, the inserter 1 described above has been provided with the spring 21, but this spring 21 can be omitted. Further, the wedge case 14 can be also omitted.

What is claimed is:

1. A coil inserter for stator winding, used for inserting a coil of a stator winding of an electric motor into slots in a stator iron core, comprising:

a plurality of blades for guiding said coil into slots in said stator iron core;

a blade holder for fixing one end of said blades and supporting said blades;

a stripper arranged within said blades, for supporting said coil;

a base for supporting said stripper and supporting said entire inserter; and a pusher, the stator being between the pusher and the base, to push the stator toward the base, wherein said blade is inserted between slots in said stator iron core and, whereby a coil supported by said stripper is caused to be inserted into said slots in said stator iron core.

2. The coil inserter for stator winding according to claim 1, wherein said blade holder moves relative to said stripper.

3. The coil inserter for stator winding according to claim 1, further comprising a plurality of wedge guides, one end of which being connected to said base, and the other end of which being connected to said stripper, wherein a wedge for covering openings of said slots in said stator iron core is held by said wedge guides.

4. The coil inserter for stator winding according to claim 1, wherein a connecting rod for penetrating a through-hole formed in a central portion of said stripper for extending is vertically installed in said blade holder at a central point thereof, and when said stator iron core is moved toward said base, said blade is also caused to move in synchronism with movement of said stator iron core through said connecting rod.

5. The coil inserter for stator winding according to claim 4, wherein alignment tools, at the central portion of which there is formed a through-hole for causing the tip end of said connecting rod to pass through, and on the outer peripheral surface of which there are formed ridges and grooves at predetermined pitches, can be mounted onto a fixed position of said connecting rod by fixing means, and said grooves on an outer peripheral surface of said alignment tools can be engaged with one end portion of said blades, and said ridges can be engaged with said slots in said stator iron core.

6. The coil inserter for stator winding according to claim 1, wherein the blades are not disposed within the pusher when the pusher pushes the stator.

7. A coil inserter for stator winding, used for inserting a coil of a stator winding of an electric motor into slots in a stator iron core, comprising:

a plurality of blades for guiding said coil into slots in said stator iron core;

a blade holder for fixing one end of said blades and supporting said blades;

a stripper arranged within said blades, for supporting said coil; and a base for supporting said stripper and supporting said entire inserter, wherein said stator iron core is caused to move toward said base, and said blade is inserted between slots in said stator iron core and, whereby a coil supported by said stripper is caused to be inserted into said slots in said stator iron core, wherein a connecting rod for penetrating a through-hole formed in a central portion of said stripper for extending is vertically installed in said blade holder at a central point thereof, and when said stator iron core is moved toward said base, said blade is also caused to move in synchronism with movement of said stator iron core through said connecting rod, wherein alignment tools, at the central portion of which there is formed a through-hole for causing the tip end of said connecting rod to pass through, and on the outer peripheral surface of which there are formed ridges and grooves at predetermined pitches, can be mounted onto a fixed position of said connecting rod by fixing means, and said grooves on an outer peripheral surface of said alignment tools can be engaged with one end portion of said blades, and said ridges can be engaged with said slots in said stator iron core, wherein in an outside circumference of a plurality of wedge guides, a wedge case is arranged movably in the longitudinal direction of said wedge and said base, and thereby said stator iron core, the slots of which are being engaged with ridges on an outer peripheral surface of said alignment tools, is held at a position spaced apart from said base by a predetermined distance by means of an elastic force of said spring.

8. The coil inserter for stator winding according to claim 7, wherein said stator iron core is capable of being caused to further move toward said base against an elastic force of said spring until said stripper located within said stator iron core is exposed from one end surface thereof.

* * * * *